United States Patent [19]

Ozawa

[11] Patent Number: 4,521,269
[45] Date of Patent: Jun. 4, 1985

[54] TIRE BUILDING APPARATUS

[75] Inventor: Chiaki Ozawa, Kodaira, Japan

[73] Assignee: Bridgestone Tire Company Limited, Tokyo, Japan

[21] Appl. No.: 565,175

[22] Filed: Dec. 23, 1983

[30] Foreign Application Priority Data

Dec. 27, 1982 [JP] Japan .................. 57-234713

[51] Int. Cl.³ ............................................ B29H 17/16
[52] U.S. Cl. .................................... 156/420; 156/400
[58] Field of Search ............... 156/420, 417, 400, 414, 156/401–403, 394.1, 397, 398, 124, 126, 132, 133, 123

[56] References Cited

U.S. PATENT DOCUMENTS

| | | | |
|---|---|---|---|
| 2,603,580 | 7/1952 | Di Cicco et al. | 156/420 X |
| 3,787,262 | 1/1974 | Appleby et al. | 156/420 X |
| 4,220,494 | 9/1980 | Kawaida et al. | 156/420 X |
| 4,425,180 | 1/1984 | Samokhvalov et al. | 156/420 X |

Primary Examiner—Edward Kimlin
Assistant Examiner—Thomas Bokan
Attorney, Agent, or Firm—Cushman, Darby & Cushman

[57] ABSTRACT

The tire building apparatus was an axially elongated drive shaft which is rotatable about its center axis. The tire building drum of the apparatus includes an axially elongated retainer sleeve which is interchangeably received on the drive shaft and rotatable with the drive shaft about the center axis of the drive shaft. A slider sleeve is slidably received on the retainer sleeve and is rotatable with the drive shaft about the center axis of the drive shaft. A plurality of link members are provided each being pivotally connected at its one end to the slider sleeve. A plurality of arcuate drum segments are provided each being equiangularly spaced apart from one another about the center axis of the axially elongated drive shaft and pivotally connected with the other end of each of the link member. The drive sleeve has an annular end plate fixedly connected thereto and movable along the axially elongated drive shaft with respect to the tire building drum and coaxially surrounding the axially elongated drive shaft. An elongated clutch arm is provided having at its one end a hook portion protruding outwardly of the annular end plate of the drive sleeve and at the other end pivotally connected to the drive sleeve. A cylindrical member is shown having a horizontal base portion slidably received on the slider sleeve, and a flange portion extending radially outwardly with respect to the axially elongated drive shaft.

5 Claims, 12 Drawing Figures

TIRE BUILDING APPARATUS

FIELD OF THE INVENTION

The present invention relates to a tire building apparatus, and more particularly to an interchangeable and radially expandable tire building drum employed in the tire building apparatus.

SUMMARY OF THE INVENTION

In accordance with the present invention, there is provided a tire building apparatus comprising, an axially elongated drive shaft extending in a longitudinal direction of the apparatus and rotatable about its center axis; a tire building drum comprising an axially elongated retainer sleeve interchangeably received on the drive shaft and rotatable with the drive shaft about the center axis of the drive shaft, a slider sleeve slidably received on the retainer sleeve and rotatable with the drive shaft about the center axis of the drive shaft, a plurality of link members each pivotally connected at its one end to the slider sleeve, and a plurality of arcuate drum segments each equiangularly spaced apart from one another about the center axis of the axially elongated drive shaft and pivotally connected with the other end of each of the link member, the arcuate drum segments forming a cylindrical shape when held in a radially outermost position with respect to the center axis of the axially elongated drive shaft; a drive sleeve having an annular end plate fixedly connected thereto and movable along the axially elongated drive shaft with respect to the tire building drum and coaxially surrounding the axially elongated drive shaft; an elongated clutch arm having at its one end a hook portion protruding outwardly of the annular end plate of the drive sleeve and at the other end pivotally connected to the drive sleeve; and a cylindrical member having a horizontal base portion slidably received on the slider sleeve, and a flange portion radially outwardly extending with respect to the axially elongated drive shaft. The flange portion of the cylindrical member has a front end face and a rear end face so that the rear end face is brought into engagement with the annular end plate of the drive sleeve while the tire building drum is radially outwardly expanding, and the front end face is brought into engagement with the hook portion of the elongated clutch arm while the tire building drum is radially inwardly contracting. The axially elongated retainer sleeve of the tire building drum is interchangeably received on the axially elongated drive shaft by fastening means comprising a spring case having a bore formed therein and fixedly mounted in the retainer sleeve in front of the tire building drum, a stop pin accommodated in the bore of the spring case and having a small radius portion and a large radius portion which is slidably received in a blind bore formed in the axially elongated drive shaft, a spring interposed between the spring case and the small radius portion of the stop pin to bias the large radius portion of the stop pin toward the blind bore, and a cap member slidably received on the spring case and connected with the small radius portion of the stop pin in a such manner that the retainer sleeve received on the axially elongated drive shaft is removed from the axially elongated drive shaft when the cap member connected with the stop pin is lifted upwardly against the spring until the large radius portion of the stop pin is taken out from the blind bore in the axially elongated drive shaft.

DESCRIPTION OF THE PRIOR ART

In manufacture of pneumatic tires, a strip material having embedded therein a plurality of fiber or steel cords is wrapped on a tire building drum of a tire building apparatus. Such strip material wrapped on the tire building drum is connected at its longitudinal ends to be formed into a cylindrical shape. After the longitudinal ends of the strip material are connected, an annular or looped bead core is positioned axially inwardly of the vicinity of the opposite axial ends of the cylindrical material wrapped on the tire building drum. The opposite axial ends of the cylindrical material are bent axially inwardly to embed the bead core therein, and thereafter a breaker ply and a tread ply are applied on the cylindrical material wrapped on the tire building drum to build a green case. This green tire is removed from the tire building drum after the drum is radially contracted. However, in manufacture of various tires, it is often required to change the tire building drum depending upon various kinds of tires. Especially, in manufacture of large-sized tires, the tire building drum is changed frequently. For this reason, the tire building drum is required to be changed with ease.

Referring to FIG. 1 of the drawings, a prior-art tire building apparatus is shown which comprises the tire building drum of the kind as described above. A drive shaft denoted by reference numeral 1 is driven for rotation about its center axis by a suitable rotary means not shown and has formed therein an axially elongated bore 2 in which an axially elongated rod 3 is slidably received and movable with respect to the drive shaft 1. A hollow shaft 4 is received on the outer peripheral surface of the drive shaft 1 and connected to the drive shaft 1 by means of a bolt 5 as shown in FIG. 1. At a substantially intermediate portion of the hollow shaft 4 a mounting range 6 is rigidly mounted on the outer peripheral surface of the hollow shaft 4. In front of the mounting ring 6 a sleeve 7 is slidably received on the outer peripheral surface of the hollow shaft 4. An end plate 8 is connected to an axial front end face of the sleeve 7 by means of a plurality of bolts 9 and to an axial front threaded portion of the rod 3 by means of a nut 10 as shown in FIG. 1. A generally cylindrical, expandable tire building drum 11 coaxially surrounds the hollow shaft 4 and comprises a plurality of arcuate segments 12 equiangularly spaced apart from one another about the center axis of the hollow shaft 4. The tire building drum 11 further comprises a plurality of first link members 13 pivotally connected at their inner ends to opposite lug portions of the sleeve 7 by pivot pins not shown and at their outer ends to the arcuate segments 12 by pivot pins not shown, and a plurality of second link members 14 pivotably connected at their outer ends to substantially intermediate portions of the first link members 13 by pivot pins not shown and at their inner ends to lug portions of the mounting ring 6 by pivot pins not shown.

In the tire building apparatus thus constructed and arranged, the rod 3 connected at its axial front end with sleeve 7 is driven for axial movement in either direction of the apparatus by suitable drive means not shown so that the sleeve 7 slidably received on the hollow shaft 4 is driven for axial movement in either direction with respect to the hollow shaft 4. The first and second link members 13 and 14 pivotally connected to the sleeve 7 are caused to turn toward and away from the hollow shaft 4 by the axial movement of the sleeve 7 and thus the arcuate segments 12 pivotally connected with first link members 14 are caused to radially inwardly move toward and radially outwardly away from the hollow shaft 4. As a consequence, the tire building drum 11 as a whole is radially expandable coaxially around the hollow shaft 4. In such a tire building apparatus, however, there have been the following problems. If the tire building drum 11 is replaced by a tire building drum having a different diameter, the end plate 8 is required to be released from the rod 3 and the sleeve 7 by unfastening the bolts 9 and 10 from the rod 3 and the sleeve 7. In this instance, in the tire building drum for large-sized tires, the end plate 8 is large and extremely heavy. This results in an increase of time for changing the tire building drum and also lowers an operational efficiency of the tire building apparatus. Further, the sleeve 7 is required to move in an axial direction of the drive shaft 1 to radially expand or contract the tire building drum 11. For this reason, the drive shaft 1 has formed therein an axial bore 2 in which the rod 3 is slidably received, and the axial movement of the rod 3 is transmitted through the end plate 8 to the sleeve 7. This results in complication in construction of the tire building apparatus. The present invention contemplates elimination of such drawbacks in the prior-art tire building apparatus of the kind as described above.

BRIEF DESCRIPTION OF THE DRAWING

The drawbacks of the prior-art tire building apparatus and the features and advantages of the tire building apparatus according to the present invention will be more clearly understood from the following description taken in conjunction with the accompanying drawings in which.

DESCRIPTION OF THE PREFERRED EMBODIMENTS

Figure 1:
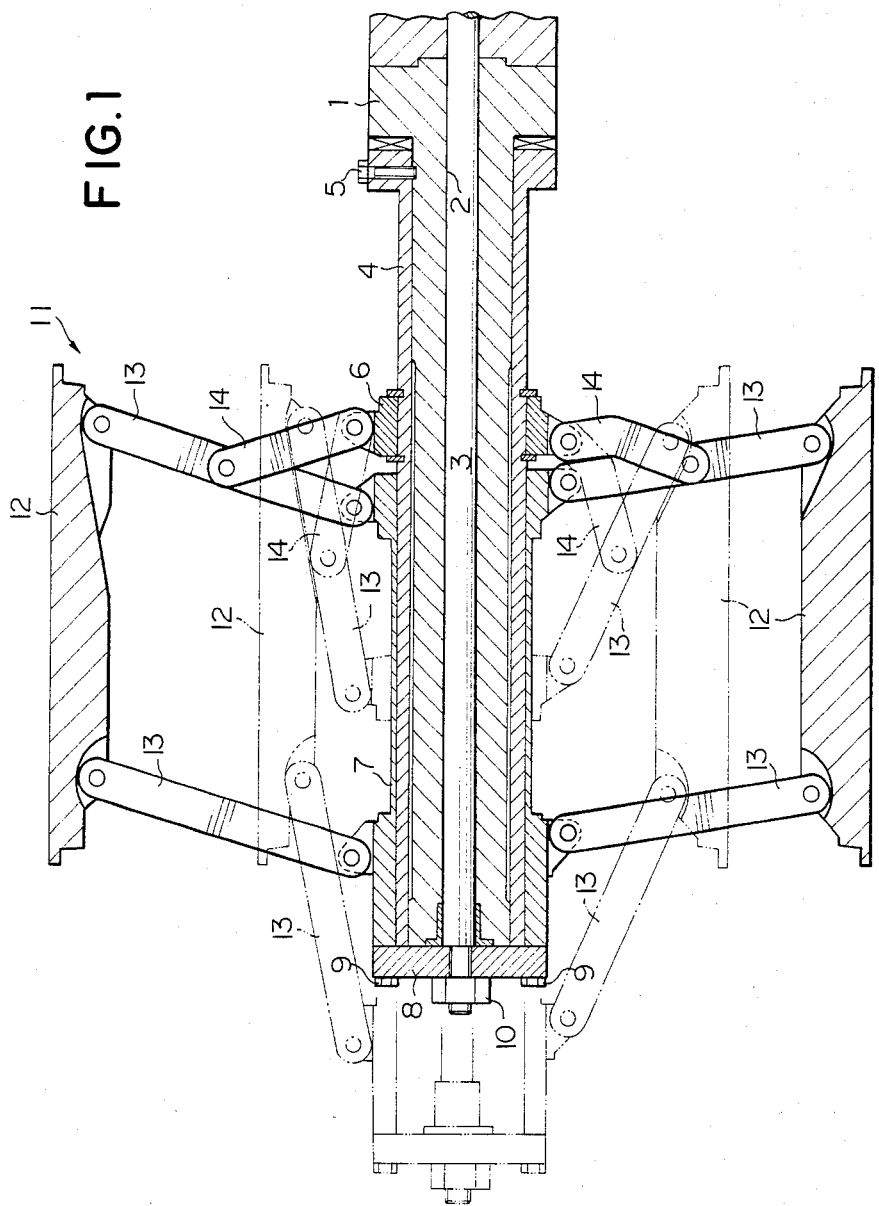
FIG. 1 is a cross sectional view showing the tire building drum of the tire building apparatus of the prior-art tire building apparatus in fully expanded condition.
Figure 2:
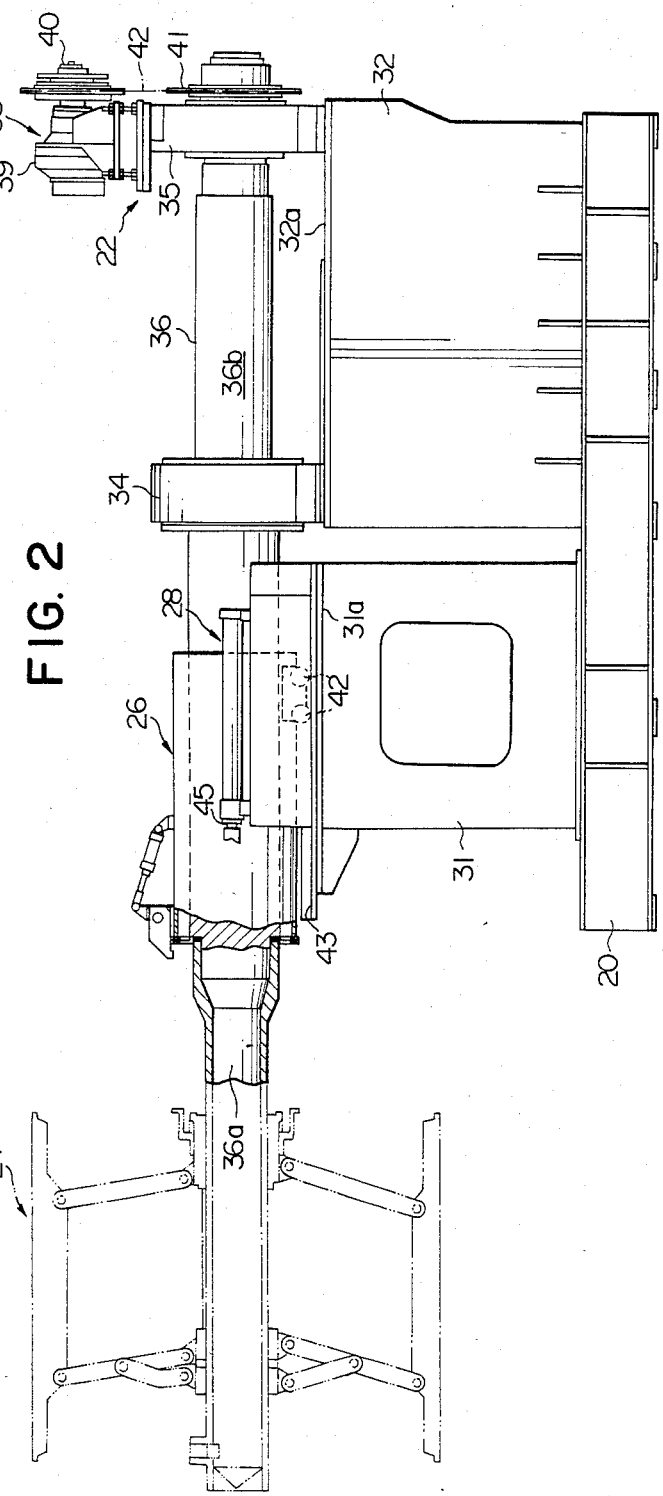
FIG. 2 is a schematic view showing the general construction and arrangement of the tire building apparatus according to the present invention.

Referring now to FIG. 2 of the drawings, a tire building apparatus embodying the present invention largely comprises a stationary base structure 20, a rotary drive unit 22, an expandable tire building drum 24, a drive sleeve 26 and a reciprocal drive unit 28. The stationary base structure 20 includes a front frame structure 31 and a rear frame structure 32 which extend perpendicularly therefrom. The front and rear frame structures 31 and 32 have fixedly mounted thereon horizontal base plates 31a and 32a, respectively. The rotary drive unit 22 comprises first and second bearings 34 and 35, respectively, securely mounted on the front and rear end portions of the upper surface of the base plate 32a on the rear frame structure 32, an axially elongated drive shaft 36 having a small radius portion 36a and a large radius portion 36b and extending in a longitudinal direction of the apparatus and rotatably received at the large radius portion 36b thereof in the bearings 34 and 35, and a chain and sprocket arrangement 38 mounted on the second bearing 35. The chain and sprocket arrangement 38 includes a drive motor 39, a driving sprocket 40 carried on an output shaft of the drive motor 39, a drive sprocket 41 carried on an axial rear end portion of the large radius portion 36b of the axially elongated drive shaft 36, and an endless chain 42 passed between the driving sprocket 40 and the driven sprocket 41. The driving sprocket 40 is driven for rotation by the drive motor 39 so that the driven sprocket 41 and accordingly the axially elongated drive shaft 36 are driven for rotation about the center axis of the axially elongated drive shaft 36. The expandable tire building drum 24 is slidably mounted on the small radius portion 36a of the axially elongated drive shaft 36 and is driven to move either longitudinal direction of the apparatus with respect to the axially elongated drive shaft 36 by the drive sleeve 26. The drive sleeve 26 coaxially surrounds the axially elongated drive shaft 36 and is rollably mounted through a suitable numbers of rollers 42 on rails 43 which are fixedly mounted on an upper surface of the base plate 31a on the front frame structure 31, the rails 43 extending in the longitudinal direction of the apparatus and in parallel with the center axis of the axially elongated drive shaft 36. The drive sleeve 26 thus constructed and arranged is driven for movement along the axially elongated drive shaft 36 in the longitudinal direction of the apparatus between a first predetermined position (in FIG. 4) and a second predetermined position (in FIG. 11) by the reciprocal drive unit 28. The reciprocal drive unit 28 is constituted by for example a fluid-operated power cylinder and is provided in the vicinity of the drive sleeve 26. The power cylinder 28 has a cylinder body fixedly mounted through a bracket member on the base plate 31a of the front frame structure 31, and a piston rod 45 projecting from the cylinder body. The piston rod 45 of the fluid-operated power cylinder 28 is axially movable in the longitudinal direction of the apparatus with respect to the cylinder body of the fluid-operated power cylinder 28 and is fixedly connected to the outer peripheral surface of the drive sleeve 26 so that the drive sleeve 26 is driven to axially move toward and away from the tire building drum 24 with respect to the axially elongated drive shaft 36 by axial movement of the piston rod 45 of the fluid-operated power cylinder 28.

Figure 3:
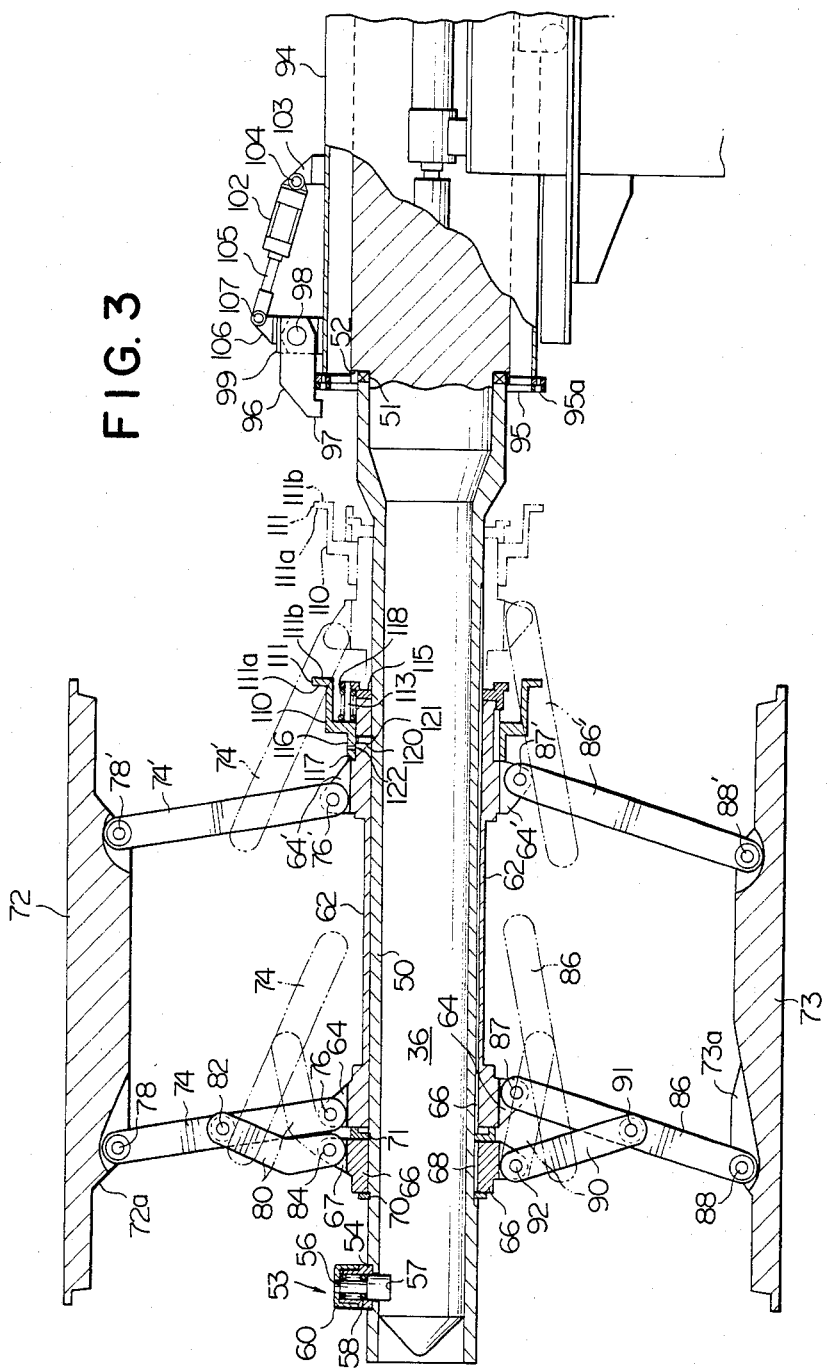
FIG. 3 is a cross sectional view showing, to an enlarged scale, a tire building drum in fully expanded condition, a cylindrical member and a drive sleeve according to the present invention.

Turning to FIG. 3 of the drawings, the tire building drum 24 forming part of the tire building apparatus according to the present invention comprises an axially elongated retainer sleeve 50 interchageably received on the outer peripheral surface of the small radius portion 36a of the axially elongated drive shaft 36 and having at an axial rear end thereof a plurality of protrusions 51 fitted into a plurality of grooves 52 formed in an axial front end face of the large radius portion 36b of the axially elongated drive shaft 36. The axially elongated retainer sleeve 50 is interchangeably received on axially elongated drive shaft 36 by fastening means 53 comprising a spring case 54 having a bore formed therein and fixedly mounted in the retainer sleeve 50 in front of the tire building drum 24, a stop pin 56 accommodated in the bore of the spring case 54 and having a small radius portion and a large radius portion which is slidably received in a blind bore 57 formed in the axially elongated drive shaft 36. The fastening means 53 further comprises a spring 58 interposed between the spring case 54 and the small radius portion of the stop pin to bias the large radius portion of the stop pin 56 toward the blind bore 57, and a cap member 60 slidably received on the spring case 54 and connected with the small radius portion of the stop pin 56 in a such manner that the retainer sleeve 50 received on the axially elongated drive shaft 36 is removed from the axially elongated drive shaft 36 when the cap member 60 connected with the stop pin 56 is lifted upwardly against the spring 58 until the large radius portion of the stop pin 56 is taken out from the blind bore 57 in the axially elongated drive shaft 36. The retainer sleeve 50 thus constructed and arranged is rotatable about the center axis of the axially elongated drive shaft 36.

The expandable tire building drum 24 further comprises a slider sleeve 62 which has at its axial opposite ends a plurality of lug portions 64 and 64' each extending radially outwardly with respect to the center axis of the axially elongated drive shaft 36 and is slidably received on the axially elongated retainer sleeve 50 through a pair of key members 66 so as to rotate with the axially elongated retainer sleeve 50 and accordingly the axially elongated drive shaft 36. A mounting block 66 having a plurality of lug portions 67 extending radially outwardly with respect to the center axis of the axially elongated drive shaft 36 is received through a key member 68 on the outer peripheral surface of the retainer sleeve 50 between the fastening means 53 and the slider sleeve 62, and fixed at its axial opposite ends by annular stop members 70 and 71 which are fixedly mounted in the axially elongated retainer sleeve 50, as shown in FIG. 3. The expandable tire building drum 24 further comprises a plurality of arcuate drum segments 72 and 73 equiangularly spaced from one another about the center axis of the axially elongated drive shaft 36. Each of these drum segments 72 has on its curved inner face a rib portion 72a longitudinally extending with respect to the center axis of the axially elongated drive shaft 36. Similarly, each of these drum segments 73 has on its curved inner face a rib portion 73a longitudinally extending with respect to the center axis of the axially elongated drive shaft 36. The expandable tire building drum 24 further comprises a first link assembly and a second link assembly which are alternately spaced equiangularly from one another about the center axis of the axially elongated drive shaft 36 and associated with lug portions 64 and 64' of the slider sleeve 62. The first link assembly comprises a first link member 74 pivotally connected at one end thereof to the lug portion 64 of the slider sleeve 62 by a pivot pin 76 and at the other end thereof to one end of the rib portion 72a of the arcuate drum segment 72 by a pivot pin 78, and a second link member 74' pivotally connected at one end thereof to the lug portion 64' of the slider sleeve 62 by a pivot pin 76' and at the other end thereof to the other end of the rib portion 72a of the arcuate drum segment 72 by a pivot pin 78'. The first link assembly further comprises a third cranked link member 80 pivotally connected at one end thereof to an intermediate portion of the first link member 74 by a pivot pin 82 and at the other end thereof to the lug portion 67 of the mounting block 66 by a pivot pin 84. Likewise, the second link assembly comprises a first link member 86 pivotally connected at one end thereof to the lug portion 64 of the slider sleeve 62 by a pivot pin 87 and at the other end thereof to one end of the rib portion 73a of the arcuate drum segment 73 by a pivot pin 88, and a second link member 86' pivotally connected at one end thereof to the lug portion 64' of the slider sleeve 62 by a pivot pin 87' and at the other end thereof to the other end of the rib portion 73a of the arcuate drum segment 73 by a pivot pin 88', and a third link member 90 pivotally connected at one end thereof to an intermediate portion of the first link member 86 by a pivot pin 91 and at the other end thereof to the lug portion 67 of the mounting block 66 by a pivot pin 92.

The drive sleeve 26 forming part of the tire building apparatus according to the present invention has an annular end plate 95 fixedly connected thereto by a suitable fastening means for example such as bolts at 95a. On the drive sleeve 26 is fixedly mounted at least one elongated clutch arm 96 each having a hook portion 97 pivotally connected by a pivot pin 98 to a bracket member 99 which is in turn securely mounted on the outer peripheral surface of an axial front end portion of the drive sleeve 26. The hook portion 97 of the elongated clutch arm 96 has an inclined face protruding outwardly of the annular end plate 95 of the drive sleeve 26. A fluid-operated power cylinder 102 has a cylinder body pivotally connected at one end thereof to a bracket member 103 securely mounted on the outer peripheral surface of the drive sleeve 26 by a pivot pin 104, and a piston rod 105 pivotally connected at its leading end to a bracket member 106 securely mounted on the bracket member 99 by a pivot pin 107 as shown in FIG. 3. The fluid-operated power cylinder 102 thus constructed and arranged is adapted to drive the hook portion 97 of the clutch arm 96 to move radially inwardly or outwardly with respect to the drive sleeve 94.

Figure 6:
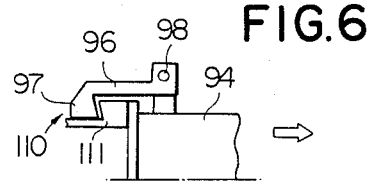

A cylindrical member 110 forming part of the tire building apparatus has at its axial rear end a flange portion 111 radially outwardly extending with respect to the center axis of the axially elongated drive shaft 36, the flange portion having an axial front end face 111a and an axial rear end face 111b as shown in FIG. 3, the front end face 111a being inclined at a predetermined angle with respect to the center axis of the drive shaft 36 and a radially outer portion of the face 111a being nearer to the drum segments 72 and 73 than a radially inner portion of the face 111a so as to be engaged by the inclined face of the hook portion 97 of the clutch arm 96 as shown in FIG. 6. The cylindrical member 110 has attached thereto a guide pin 113 slidably received in a bore formed in an annular stop member 115. The annular stop member 115 is attached to an axial rear end face of the slider sleeve 62 and also slidably received on the outer peripheral surface of the retainer sleeve 50. The cylindrical member 110 further has a horizontal base portion 116 slidably received on a circumferential recess portion 117 which is formed at the axial rear end portion of the slider sleeve 62 in the vicinity of the lug portions 64' of the slider sleeve 62. A compression spring 118 is provided to bias the cylindrical member 110 toward the circumferential recess portion 117 between the cylindrical member 110 and the stop member 115. A compressible pin 120 is radially slidably accommodated in a radially elongated bore formed in the circumferential recess portion 117 of the slider sleeve 62. In the axially elongated retainer sleeve 50 is formed a circular cone bore 121 with which the lower end of the compression spring 118 engages, and in the horizontal base portion 116 of the cylindrical member 110 is formed a circular cone bore 122 with which the upper end of the compressible pin 120 engages.

Description will be hereinafter made in regard to the operation of the tire building apparatus thus constructed and arranged.

Figure 4:
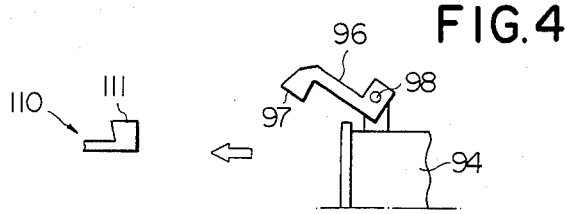
FIGS. 4 to 9 are schematic views showing axial movement of the cylindrical member and the drive sleeve shown in FIG. 3 while the tire building drum is radially inwardly contracting.

The arcuate drum segments 72 and 73 of the tire building drum 24 shown in FIG. 3 are held in fully expanded condition, and the axial front end face of the slider sleeve 62 is brought into engagement with the annular member 71. Each of the arcuate segments 72 and 73 is held in a radially outermost position with respect to the center axis of the axially elongated drive shaft 36 in which the tire building drum 24 as a whole forms a substantially cylindrical shape with respect to the center axis of the axially elongated drive shaft 36. The piston rod 45 of the fluid-operated power cylinder 28 is held in a position in which the drive sleeve 26 assumes the above noted first predetermined position as shown in FIG. 4. The piston rod 105 of the fluid-operated power cylinder 102 is held in a position in which the hook portion 97 of the elongated clutch arm 96 is turned radially outwardly about the pivot pin 98 and positioned outwardly of the annular end plate 95 on the axial front end face of the drive sleeve 26 as shown in FIG. 4.

Figure 5:
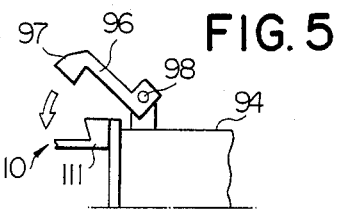
Figure 7:
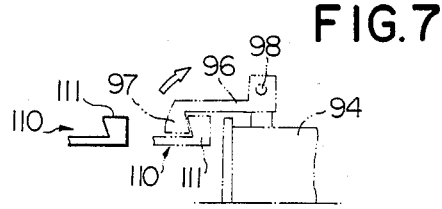
Figure 8:
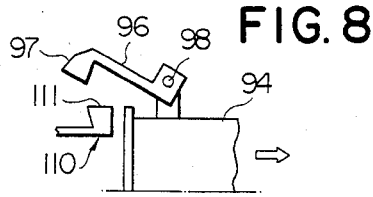
Figure 9:
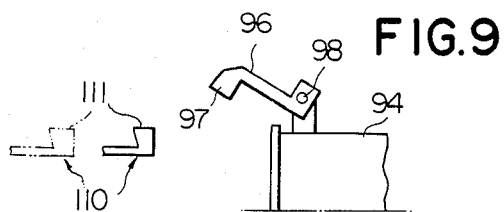

When the tire building drum 24 as a whole is caused to be contracted radially inwardly with respect to the center axis of the axially elongated drive shaft 36, the fluid-operated power cylinder 28 is first actuated to drive the piston rod 45 thereof to project therefrom so that the drive sleeve 26 connected with the piston rod 45 is caused to move forwardly toward the flange portion 111 of the cylindrical member 110 along the axially elongated drive shaft 36. The fluid-operated power cylinder 28 is brought to a stop when the annular end plate 95 of the drive sleeve 26 is brought into engagement with the axial rear end face 111b of the flange portion 111 of the cylindrical member 110 as shown in FIG. 5. The fluid-operated power cylinder 102 on the drive sleeve 94 is then actuated to drive the piston rod 105 thereof to project from the cylinder body thereof so that the clutch arm 96 is caused to turn radially inwardly about the pivot pin 98 as shown in FIG. 6. Next, the fluid-operated power cylinder 28 is again actuated to drive the piston rod 45 to retract in the cylinder body thereof so that the hook portion 97 of the elongated clutch arm 96 is caused to move backwardly along the axially elongated drive shaft 36. As a consequence, the rear end face of the hook portion 97 of the elongated clutch arm 96 is engaged with the axial front end face 111a of the flange portion 111 of the cylindrical member 110. The drive sleeve 26 is further driven to move backwardly away from the tire building drum 24 by the piston rod 45 of the fluid-operated power cylinder 28 so that the cylindrical member 110 slidably receive on the circumferential recess portion 117 of the slider sleeve 62 is caused to move backwardly together with the elongated clutch arm 96 until the cylindrical member 110 is brought into engagement with the stop member 115 against the compression spring 118. In this instance, when the cylindrical member 110 is brought into engagement with the stop member 115 against the compression spring 118, the circular cone bore 122 formed in the cylindrical member 110 is vertically aligned with the upper end of the compressible pin 120. The drive sleeve 26 is further driven to move backwardly away from the tire building drum 24 by the piston rod 45 of the fluid-operated power cylinder 28 so that the link members 74, 74', 80, 86, 86' and 90 are caused to turn radially inwardly toward the center axis of the axially elongated drive shaft 36 about the pivot pins 76, 76', 84, 87, 87' and 92, respectively. The link members 74, 74', 80, 86, 86' and 90 thus being driven to turn toward the center axis of the axially elongated drive shaft 36, each of the arcuate drum segments 72 and 73 and accordingly the tire building drum 24 as a whole are caused to be contracted toward the center axis of the axially elongated drive shaft 36. Concurrently when the arcuate drum segments 72 and 73 move radially inwardly toward the center axis of the axially elongated drive shaft 36, the lower end of the compressible pin 120 disengages from the circular cone bore 121 formed in the axially elongated retainer sleeve 50, and the upper end of the compressible pin 120 engages with the circular cone bore 122 formed in the cylindrical member 110. The drive sleeve 26 is brought to a stop at the time when the drive sleeve 26 further moves backwardly away from the tire building drum 24 and the cylindrical member 110 moves backwardly to a position indicated by phantom lines as shown in FIGS. 3 and 7. At this time, each of the arcuate drum segments 72 and 73 is fully contracted, and the upper end of the compressible pin 120 is held into engagement with the circular cone bore 122 in the cylindrical member 110 and lower end of the the compressible pin 120 is held into engagement with the outer peripheral surface of the axially elongated retainer sleeve 50. As a consequence, while each of the arcuate drum segments 72 and 73 and accordingly the tire building drum 24 are contracting radially inwardly, the axial front end face 111a of the flange portion 111 of the cylindrical member 110 is held into engagement with the rear end face of the hook portion 97 of the elongated clutch arm 96. When, next, the elongated clutch arm 96 is caused to turn radially outwardly about the pivot pin 98 by retracting the piston rod 105 of the fluid-operated power cylinder 102, the hook portion 97 of the elongated clutch arm 96 disengages from the axial front end face 111a of the flange portion 111 of the cylindrical member 110 and is held in a position having the hook portion 97 positioned radially outwardly of the outer peripheral surface of the flange portion 111 as shown in FIG. 8. The fluid-operated power cylinder 28 is then again actuated to drive the piston rod 45 thereof to move backwardly away from the tire building drum 24 so that the drive sleeve 26 is caused to move backwardly away from the tire building drum 24. When the drive sleeve 26 resumes at its initial position as shown in FIG. 9, the operation of the fluid-operated power cylinder 28 is brought to a stop.

Figure 10:
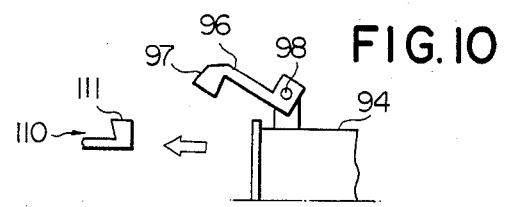
FIGS. 10 to 12 are schematic views showing axial movement of the cylindrical member and the drive sleeve shown in FIG. 3 while the tire building drum is radially outwardly expanding.
Figure 11:
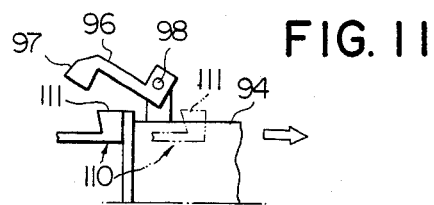
Figure 12:
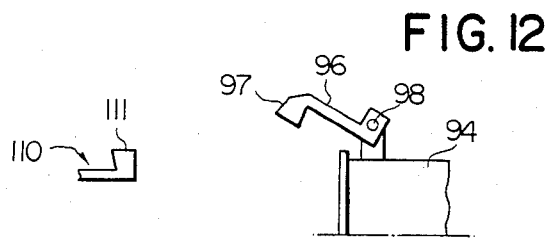

When, next, the tire drum segments 72 and 73 are caused to expand radially outwardly from the fully contracted condition as described above, the link members 74, 74', 80, 86, 86' and 90, as described above, are held in a radially innermost position as indicated by phantom lines in FIG. 3 and each of the tire drum segments 72 and 73 is held in the closest position with respect to the axially elongated drive shaft 36. The elongated clutch arm 96 is held in a radially outward position as shown in FIG. 10 in which the hook portion 97 thereof is positioned radially outwardly of the outer peripheral surface of flange portion 111 of the cylindrical member 110. The drive sleeve 94 with the hook portion 97 of the clutch arm 96 thus held is then driven to move forwardly toward to the tire building drum 24 by projecting the piston rod 45 forwardly toward to the tire building drum 24 so that the annular end plate 95 on the drive sleeve 94 is brought into engagement with the axial rear end face 111b of the annular flange portion 111 of the cylindrical member 110. The drive sleeve 94 is further driven to move forwardly toward the tire building drum 24 so that the cylindrical member 110 is caused to move forwardly together with the slider sleeve 62 along and on the retainer sleeve 50 in the longitudinal direction of the apparatus. As a consequence, the link members 74, 74', 80, 86, 86' and 90 are caused to turn radially outwardly away from the center axis of the axially elongated drive shaft 36 about the pivot pins 76, 76', 84, 87, 87' and 92, respectively. The link members 74, 74', 80, 86, 86' and 90 thus being driven to turn away from the center axis of the axially elongated drive shaft 36, each of the arcuate drum segments 72 and 73 and accordingly the tire building drum 24 as a whole are caused to be expanded away from the center axis of the axially elongated drive shaft 36. When drive sleeve 94 is further driven to move forwardly toward the tire building drum 24 and the axial front end face of the slider sleeve 62 is brought into engagement with the annular stop member 71, each of the tire drum segments 72 and 73 is held in the radially outermost position with respect to the center axis of the axially elongated drive shaft 36 and thus the tire building drum 24 as a whole forms a substantially cylindrical shape about the center axis of the axially elongated drive shaft 36. At the same time when the arcuate drum segments 72 and 73 is held in the radially outermost position, the compressible pin 120 is vertically aligned with the circular cone bore 121 in the retainer sleeve 50. When the drive sleeve 94 is further driven to move forwardly toward the tire building drum 24, the cylindrical member 110 slidably received on the circumferential recess portion 117 of the slider sleeve 62 is caused to move forwardly on and along the circumferential recess portion 117 upon the spring force of the compression spring 118. As a consequence, the compressible pin 120 moves radially downwardly with respect to the center axis of the axially elongated drive shaft 36, and the upper end of the compressible pin 120 disengages from the circular cone bore 122 in the horizontal base portion 112 of the cylindrical member 110 and the lower end of the compressible pin 120 engages with the circular cone bore 121 in the retainer sleeve 50. When, further, the axial front end face of the horizontal base portion 116 of the cylindrical member 110 is brought into engagement with the axial end face of the circumferential recess portion 117 of the slider sleeve 62, the drive sleeve 94 is brought to a stop at the above noted second predetermined position as shown in FIG. 11. At this time, each of the arcuate drum segments 72 and 73 is fully expanded, and lower end of the the compressible pin 120 is held into engagement with the circular cone bore 121 in the axially elongated retainer sleeve 50 and the upper end of the compressible pin 120 is held into engagement with the inner peripheral surface of the horizontal base portion 116 of the cylindrical member 110. As a consequence, while each of the arcuate drum segments 72 and 73 and accordingly the tire building drum 24 are expanding radially outwardly, the axial rear end face 111b of the flange portion 111 of the cylindrical member 110 is held into engagement with the front end face of the annular end plate 95 on the drive sleeve 94. Next, the drive sleeve 94 is driven to move backwardly to resume the first predetermined position as shown in FIG. 12 by retracting the piston rod 45 in the cylinder body of the fluid-operated power cylinder 28.

What is claimed is:

1. A tire building apparatus comprising,
an axially elongated drive shaft extending in a longitudinal direction of said apparatus and rotatable about its center axis;
a tire building drum comprising an axially elongated retainer sleeve interchangeably received on said drive shaft and rotatable with said drive shaft about the center axis of said drive shaft, a slider sleeve slidably received on said retainer sleeve and rotatable with said drive shaft about the center axis of said drive shaft, a plurality of link members each pivotally connected at its one end to said slider sleeve, and a plurality of arcuate drum segments each equiangularly spaced apart from one another about the center axis of said drive shaft and pivotally connected with the other end of each of said link member, the arcuate drum segments forming a cylindrical shape when held in a radially outermost position with respect to said center axis of said axially elongated drive shaft;
a drive sleeve having an annular end plate fixedly connected thereto and movable along said axially elongated drive shaft with respect to said tire building drum and coaxially surrounding said axially elongated drive shaft;
at least an elongated clutch arm having at its one end a hook portion protruding outwardly of said annular end plate of said drive sleeve and at the other end pivotally connected to said drive sleeve; and
a cylindrical member having a horizontal base portion slidably received on said slider sleeve, and a flange portion radially outwardly extending with respect to said axially elongated drive shaft;
said flange portion of said cylindrical member having a front end face and a rear end face so that the rear end face is brought into engagement with said annular end plate of said drive sleeve while said tire building drum is radially outwardly expanding, and the front end face is brought into engagement with said hook portion of said elongated clutch arm while said tire building drum is radially inwardly contracting.

2. A tire building apparatus as set forth in claim 1, in which said hook portion of said elongated clutch arm has an inclined face protruding outwardly of said annular end plate of said drive sleeve, and said front end face of said flange portion of said cylindrical member is inclined toward said rear end face of said flange portion of said cylindrical member so as to be engaged by the inclined face of said hook portion of said clutch arm.

3. A tire building apparatus as set forth in claim 2, in which the number of said clutch arm is more than two.

4. A tire building apparatus as set forth in claim 1, in which said axially elongated retainer sleeve of said tire building arm is interchangeably received on said axially elongated drive shaft by fastening means comprising a spring case having a bore formed therein and fixedly mounted in said retainer sleeve in front of said tire building drum, a stop pin accommodated in said bore of said spring case and having a small radius portion and a large radius portion which is slidably received in a blind bore formed in said axially elongated drive shaft, a spring interposed between said spring case and the small radius portion of said stop pin to bias the large radius portion of the stop pin toward the blind bore, and a cap member slidably received on said spring case and connected with the small radius portion of said stop pin in a such manner that said retainer sleeve received on said axially elongated drive shaft is removed from the axially elongated drive shaft when said cap member connected with said stop pin is lifted upwardly against said spring until the large radius portion of said stop pin is taken out from said blind bore in said axially elongated drive shaft.

5. A tire building apparatus as set forth in claim 3, in which said axially elongated retainer sleeve of said tire building drum is interchangeably received on said axially elongated drive shaft by fastening means comprising a spring case having a bore formed therein and fixedly mounted in said retainer sleeve in front of said tire building drum, a stop pin accommodated in said bore of said spring case and having a small radius portion and a large radius portion which is slidably received in a blind bore formed in said axially elongated drive shaft, a spring interposed between said spring case and the small radius portion of said stop pin to bias the large radius portion of the stop pin toward the blind bore, and a cap member slidably received on said spring case and connected with the small radius portion of said stop pin in a such manner that said retainer sleeve received on said axially elongated drive shaft is removed from the axially elongated drive shaft when said cap member connected with said stop pin is lifted upwardly against said spring until the large radius portion of said stop pin is taken out from said blind bore in said axially elongated drive shaft.

* * * * *